United States Patent
Zeng et al.

(10) Patent No.: US 8,839,436 B2
(45) Date of Patent: Sep. 16, 2014

(54) METHOD AND SYSTEM FOR ANTIVIRUS BY SIM CARD COMBINED WITH CLOUD COMPUTING

(75) Inventors: Yang Zeng, Beijing (CN); Yu Lin, Beijing (CN); Shihong Zou, Beijing (CN)

(73) Assignee: Beijing Netqin Technology Co., Ltd, Beijing (CN)

( * ) Notice: Subject to any disclaimer, the term of this patent is extended or adjusted under 35 U.S.C. 154(b) by 0 days.

(21) Appl. No.: 13/414,920

(22) Filed: Mar. 8, 2012

(65) Prior Publication Data
US 2012/0233696 A1 Sep. 13, 2012

(30) Foreign Application Priority Data
Mar. 9, 2011 (CN) .......................... 2011 1 0056830

(51) Int. Cl.
| | |
|---|---|
| H04L 29/06 | (2006.01) |
| G09F 21/00 | (2006.01) |
| G06F 9/00 | (2006.01) |
| G06F 21/56 | (2013.01) |
| G06F 21/00 | (2013.01) |
| H04W 12/12 | (2009.01) |
| G06F 21/34 | (2013.01) |
| G06F 21/57 | (2013.01) |
| H04W 12/00 | (2009.01) |
| H04W 4/00 | (2009.01) |
| H04L 29/08 | (2006.01) |

(52) U.S. Cl.
CPC *H04L 29/06* (2013.01); *G06F 9/00* (2013.01); *H04L 63/145* (2013.01); *H04W 4/001* (2013.01); *G06F 21/56* (2013.01); *G06F 21/00* (2013.01); *H04L 67/10* (2013.01); *H04W 12/12* (2013.01); *G06F 21/34* (2013.01)

USPC .................. 726/24; 726/8; 726/25; 713/189; 455/410; 455/412.2; 455/419

(58) Field of Classification Search
USPC ........ 726/24, 8, 25; 713/189; 455/410, 412.2, 455/419
See application file for complete search history.

(56) References Cited

U.S. PATENT DOCUMENTS

| | | | | |
|---|---|---|---|---|
| 2009/0305687 | A1* | 12/2009 | Baldan ......................... | 455/419 |
| 2010/0050261 | A1* | 2/2010 | Park ................................ | 726/24 |
| 2011/0126287 | A1* | 5/2011 | Yoo ................................ | 726/24 |
| 2012/0028615 | A1* | 2/2012 | Sundaramurthy et al. . | 455/412.2 |

FOREIGN PATENT DOCUMENTS

| | | | |
|---|---|---|---|
| EP | 1303099 A2 | * | 4/2003 |
| WO | WO 2013126259 A1 | * | 8/2013 |

OTHER PUBLICATIONS

Deepti Sahu, Shipra Sharma, Vandana Dubey, Alpika Tripathi; "Cloud Computing in Mobile Applications"; Aug. 2012; International Journal of Scientific and Research Publications, vol. 2, Issue 8, pp. 1-9.*

* cited by examiner

*Primary Examiner* — Kambiz Zand
*Assistant Examiner* — Courtney Fields
(74) *Attorney, Agent, or Firm* — Scully, Scott, Murphy & Presser, P.C.

(57) ABSTRACT

The invention provides a method and a system of antivirus solution by using a SIM card combined with cloud antivirus. The method comprises that the signature data of a file of a present mobile device is sent to a cloud server; the cloud server receives the file the signature data and checks the received file the signature data by using a cloud virus database stored at the cloud server; and the cloud server sends the checking result back to the SIM card of the mobile device via OTA (Over-the-Air).
The invention has the advantage of using the SIM card as the media of antivirus and communication so as to be convenient for the cooperation between a telecommunication service provider and an antivirus software vendor.

18 Claims, 6 Drawing Sheets

METHOD AND SYSTEM FOR ANTIVIRUS BY SIM CARD COMBINED WITH CLOUD COMPUTING

FIELD OF THE INVENTION

The invention relates to communication security field, and specifically, relates to method and system for antivirus by SIM card combined with cloud computing.

BACKGROUND OF THE INVENTION

At present, the security problem of mobile device is more and more serious. However, mobile device antivirus software must rely on mobile device operating systems, such as Symbian platform developed by Nokia, Android platform developed by Google and IOS platform developed by Apple. The mobile device antivirus software must be developed for every operating system so as to dealing with the security threat caused by vulnerability of the platform. However, due to the complication of the operating system platform of the mobile device, it might inconvenient or confused for a user to choose and install an antivirus software system corresponding to an operating system by oneself.

Generally, a commercial charging mode of mobile device antivirus software relies on telecom service provider. That is to say, after an antivirus software user installs an antivirus software on a mobile device, the software is activated by communicating with a server side via wireless internet and the license fee of the antivirus software is charged by the telecom service provider from a personal account of the user. An antivirus software vendor obtains revenue by paying the telecommunication service provider a certain percentage of service fee or adapting revenue-sharing mode. SIM card (Subscriber Identity Module) is used widely as a connection between the telecommunication service provider and the user. The user information, such as a telephone number, stored in SIM card is used for identifying the user. Therefore, as the only effective way for identifying a user, SIM card connects the three parties, e.g. the antivirus software, the user and the telecom service provider, together. When a user replaces a mobile device only, SIM card will not be changed accordingly. What the user needs to do is just taking the SIM card out from a former mobile device and installs it to a newly mobile device. However, there is no solution for solving the security problem of the mobile device via the SIM card.

In order to realize cross-platform technology, cloud antivirus is applied on large scale. However, the implementing cloud antivirus on the mobile device completely relies on wireless internet communication, such as GPRS or CDMA1x, etc., which might cause potential danger to the security of the mobile device and the user privacy. Therefore, there is no better way for antivirus of the cross-platform security in prior art. In order to achieve a comprehensive effect, the technical problem solved by the invention is for providing a method of using SIM card combined with cloud antivirus for implementing security strategy on the mobile device of cross-platform.

SUMMARY OF THE INVENTION

The technical problem solved by the invention is providing a technical solution for implementing cloud antivirus effectively based on the communication between a telecom service provider and SIM card.

The invention provides an antivirus method by using Over-the-Air (OTA) technology combined cloud antivirus. SIM card sends content required virus checking to a cloud server via the upstream OTA communication. The cloud server sends the result of virus checking back to the SIM card via the downstream OTA communication.

In one aspect of the invention, an adapted technical solution is providing a method for performing antivirus operation by using a SIM card combined with a cloud antivirus engine. In the method, signature data of a file of a present mobile device is sent to a cloud server by using OTA communication; the cloud server receives file signature data and checks the received file signature data via a cloud virus database stored at the cloud server; and the cloud server sends the checking result back to the SIM card of the mobile device by using OTA.

In one aspect of the invention, a method for performing antivirus operation by using the SIM card combined with the cloud antivirus engine comprises sending the checking result by the SIM card to the client side on the mobile device.

In one aspect of the invention, using OTA communication comprises sending the signature data of the file of the mobile device to a telecom base station by using a short message or a multimedia message and subsequently to the cloud server from the telecom base station.

In one aspect of the invention, checking the received file signature data by using the cloud virus database stored in the cloud server comprises using the cloud antivirus engine to compare the signature data of the file of the mobile device with the virus file signature data stored in the cloud virus database piece by piece.

In one aspect of the invention, the cloud antivirus engine receives information related to the operating system of the client side on the mobile device; the checking is limited to research the classification of the cloud antivirus database corresponding to the platform of the operating system.

In one aspect of the invention, before sending the signature data of the file of the mobile device to the cloud server by the SIM card, a SIM card virus database is used to check the signature data of the file in the mobile device.

In one aspect of the invention, a SIM card antivirus engine is used to compare the signature data of the file in the mobile device with the virus file signature data stored in the SIM card virus database piece by piece.

In one aspect of the invention, an antivirus engine of the client side on the mobile device is used to compare the signature data of the file of the mobile device and the virus file signature data stored in the SIM card virus database piece by piece.

In one aspect of the invention, the telecom side updates the virus database of the SIM card regularly via OTA in form of data broadcast.

In one aspect of the invention, the invention further provides a system for performing antivirus operation by using SIM card combined with cloud antivirus engine, which comprises a SIM card, a client side on the mobile device, a cloud antivirus engine and a cloud virus database; the client side on the mobile device is arranged to send the signature data of a file of a mobile device to the cloud antivirus engine via OTA communication; the cloud antivirus engine is arranged to use the cloud virus database to check the signature data of the file of the mobile device and the SIM card is arranged to receive the virus checking result of the cloud antivirus engine via OTA communication.

By adapting the SIM card as a communication media of OTA, the invention has advantage and convenience for the telecom service provider to promote antivirus software.

Furthermore, by adapting the OTA communication technology as a means of communication between the mobile device and the cloud server, the invention has the advantage of avoiding the conflict caused to other business of mobile internet.

Furthermore, by adapting the antivirus engine and the virus database of the cloud server to implement virus checking, the invention reduces the workload of the processor of the mobile device. In addition, the invention has convenience in increasing the running speed of the mobile device without storing mass data of virus database on the mobile device.

BRIEF DESCRIPTION OF THE DRAWINGS

The present invention will become better understood with regard to the following accompanying drawings.

DETAILED DESCRIPTION OF THE INVENTION

The invention provides an antivirus method of by using a SIM card combined with a cloud antivirus engine. The SIM card sends content required virus checking to a cloud server via upstream communication of OTA and the cloud server sends the result of virus checking back to the SIM card via downstream communication of OTA.

Figure 1:
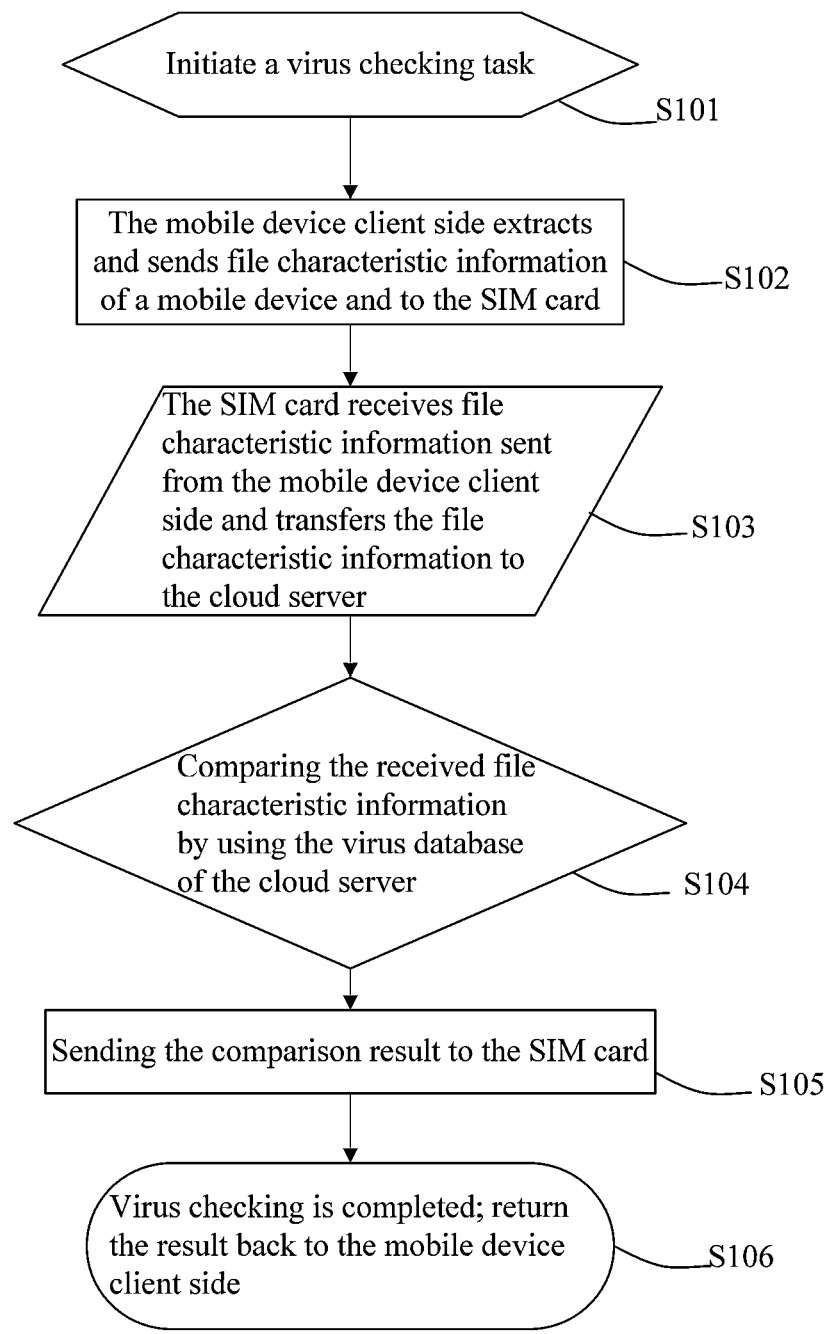
FIG. 1 is a flowchart illustrating operating a SIM card combined with cloud antivirus according to the present invention.

According one embodiment of the invention, using a SIM card combined with cloud antivirus to implement virus checking comprises the following steps. Referring to flowchart of FIG. 1, in step S101, the client side on the mobile device initiates an antivirus task. The antivirus task can be initiated manually by a user at a client side on the mobile device, or the antivirus task can be initiated at a set time according to the setting of the client side on the mobile device, or the antivirus task can be initiated for responding to other operations of the client side on the mobile device, such as installing program or file download.

In step S102, the client side on the mobile device extracts file signature data of a mobile device and sends the file signature data to the SIM card. The signature data can include file name, attributes corresponding to the operating system platform and the file fingerprint. Specifically, a message digest is generated for every file which requires virus checking in the mobile device according to the binary code of the file. Such computing progress can adapt secure hash algorithms such as SHA-1 or MD5 or other algorithms. Whatever the algorithm is, such rendering progress only needs to guarantee that every virus file corresponds an unique digest for the convenience of identifying and extracting virus file. The files which require virus checking can include all of the executable files, the files which are being executed in a progress list. Furthermore, a newly installed application file or a downloaded file, etc. can also be included.

The communication between the mobile device and the SIM card follows ISO7816-4 standard specification protocol. The protocol is a word Oriented Protocol, e.g. word is a minimum data unit which can be transferred between the SIM card and the mobile device. A word can contain an Application Protocol Data Unit (APDU) for defining specific application. According to the ISO7816-4 standard specification protocol, the mobile device transfers a specific APDU command to the SIM card via Specific Programming Interface (SPI) and returns the response of the SIM card back so as to invoke the resources and functions of the SIM card. The client side on the mobile device sends the file signature data to the SIM card via the communication protocol. The SIM card receives a list of the file signature data and transforms the list to be in a format, which is adaptable for sending via upstream communication of OTA, by using a processor in the SIM card. Specific formats can be different according to different requirements of the telecommunication service provider. For example, the short message format, the multimedia message format or a format which is adaptable to upstream transmission of WAP communication.

According to one embodiment of the invention, transforming the format of the file signature data can be completed by the client side on the mobile device. Specific formats can be different according to different requirements of the telecom service provider. For example, the short message format, the multimedia message format or a format which is adaptable to upstream transmission of WAP communication.

In step S103, the SIM card receives file signature data sent from the client side on the mobile device and transfers the file signature data to the cloud server. Such process of transferring adapts upstream communication of OTA (Over-the-Air Technology). According to one embodiment of the invention, OTA described in the following adapts short message format. The communication between the client side on the mobile device and the telecom service provider follows the transmission means of SMS_PP described in GSM03.48. According to the purpose and the technical problem solved by the present invention, those skilled in the art can appreciate that other formats of OTA, such as multimedia message or upstream transmission of WAP communication format, are adaptable as well. Specifically, virus checking task and the file signature data is transferred in form of datagram which is encoded by the processor of SIM card system or the mobile device. Data in the datagram is segmented and corresponding MAC codes and random bits are generated. Following the limitation of the format and the byte length of the short message regulated by the telecom service provider, data segment is generated to one short message or more; and the synchronize sequence number of the short message is encoded. Then the generated short message is sent to the base station of the telecom service provider via the mobile device; subsequently, the short message is transferred to the cloud server.

The cloud server receives the short message which contains the virus checking task and the file signature data and restores the one or more short messages to the datagram of the virus checking task and the file signature data. Then the cloud server sends the datagram to a cloud antivirus engine. In step S104, the cloud antivirus engine reads the virus checking task and invokes a cloud virus database. The cloud antivirus engine compares the file signature data in the file signature data list and the virus file signature data stored in the cloud virus database piece by piece.

According one embodiment of the invention, the cloud virus database is stored with virus signature data of all the prevalent viruses of mobile devices. And the information in the cloud virus database is classified according to mobile device operating system platforms or the types of the virus files. The cloud antivirus engine reads the information related to the operating system platform class or the file class when reading the antivirus task and invokes the sub-class in the cloud virus database for virus checking.

According to the embodiment, the cloud virus database includes a list of virus information which is generally provided by an antivirus software provider. The virus information at least includes three types of information, e.g. virus type, virus name and signature code of virus. The virus types for the mobile device include, but not limited to, malicious payment, privacy stealing and projan, etc. Generally, virus name is a name defined by an antivirus software company or other organizations for virus, for example, geimimi.A. Virus signature code is computed by an antivirus software company for a special virus file. Specifically, a message digest is generated for binary code of every virus file. Such computing progress can adapt secure hash algorithms such as SHA-1 or MD5 or other algorithms. Whatever the algorithm is, such rendering progress only needs to guarantee that every virus file corresponds an unique digest information for the convenience of identifying and extracting virus file.

In step S104, the cloud antivirus engine sends the result of virus checking to the cloud server firstly. The cloud server encodes the datagram of the result of virus checking and transforms the format of the datagram into a short message format which is adaptable for sending by the telecommunication service provider. The cloud server sends the short message which contains virus checking result to a telecom base station and the base station sends the short message to the mobile device in form of data broadcast of OTA technology. Such communication follows the transmission means of SMS_PP described by GSM03.48. The SIM card in the mobile device uses downstream communication of OTA technology to download the short message containing virus checking result to the SIM card. In case more than one short message are included, the processor of the SIM card will sort those short messages. The data in the short message is decoded to generate datagram of the virus checking result and in step S106 the datagram is transferred to the client side on the mobile device. The communication between the SIM card and the client side on the mobile device follows ISO7816-4 standard specification protocol.

According one embodiment of the invention, the process of sorting the short message and decoding the data can be completed by the client side on the mobile device. The SIM card submits the received short message to the client side on the mobile device directly.

The client side on the mobile device will further process the result of virus checking. For example, the client side on the mobile device will perform virus checking further on the file in the mobile device or process the file containing virus. The possible way for processing the file containing virus includes deleting, killing process or isolating file, etc.

According to the embodiment, an adapted mobile device includes a mobile phone, a netbook, an Internet-capable PDA or an internet-capable E-book. The adapted SIM (Subscriber Identity Module) card is called smart card or user identification card as well. Only if a digital mobile phone or a mobile netbook has a SIM card, can the mobile phone or the mobile netbook can be used. SIM card is a smart card with a microprocessor, which generally includes a CPU, a program memory ROM, a working memory RAM, a data memory unit (EPROM or E2PROM) and a serial communication unit. The SIM card has some certain storage capacity, which can store contents such as information of the digital mobile user, encryption key and phonebook of the user; furthermore, the SIM card can be used for identifying a digital mobile user and encrypting voice information when the user is talking on the phone. According to the embodiment, the capacity of the data storage unit of the adapted SIM card could be 8K, 16K, 32K or 64K; or the SIM card has mass storage such as 512 k, 1 g, or more than 4 g.

According to one embodiment of the invention, using SIM card and cloud antivirus to implement virus checking comprises using a SIM card antivirus engine and a SIM card virus database to check virus. By implementing the antivirus engine and the virus database on the SIM card and then installing corresponding client side on the mobile device side, virus checking can be implemented by the interaction between the client side and the SIM card. The client side on the mobile device can communicate with SIM card and send software information installed on the mobile device and the file information of the mobile device to the SIM card antivirus engine; the SIM card antivirus engine receives program information and the file information on the mobile device sent by the client side on the mobile device and determines whether virus is existed by the SIM card virus database and returns the result of antivirus back; the client side on the mobile device handles corresponding process according to the returned result of antivirus.

Figure 2:
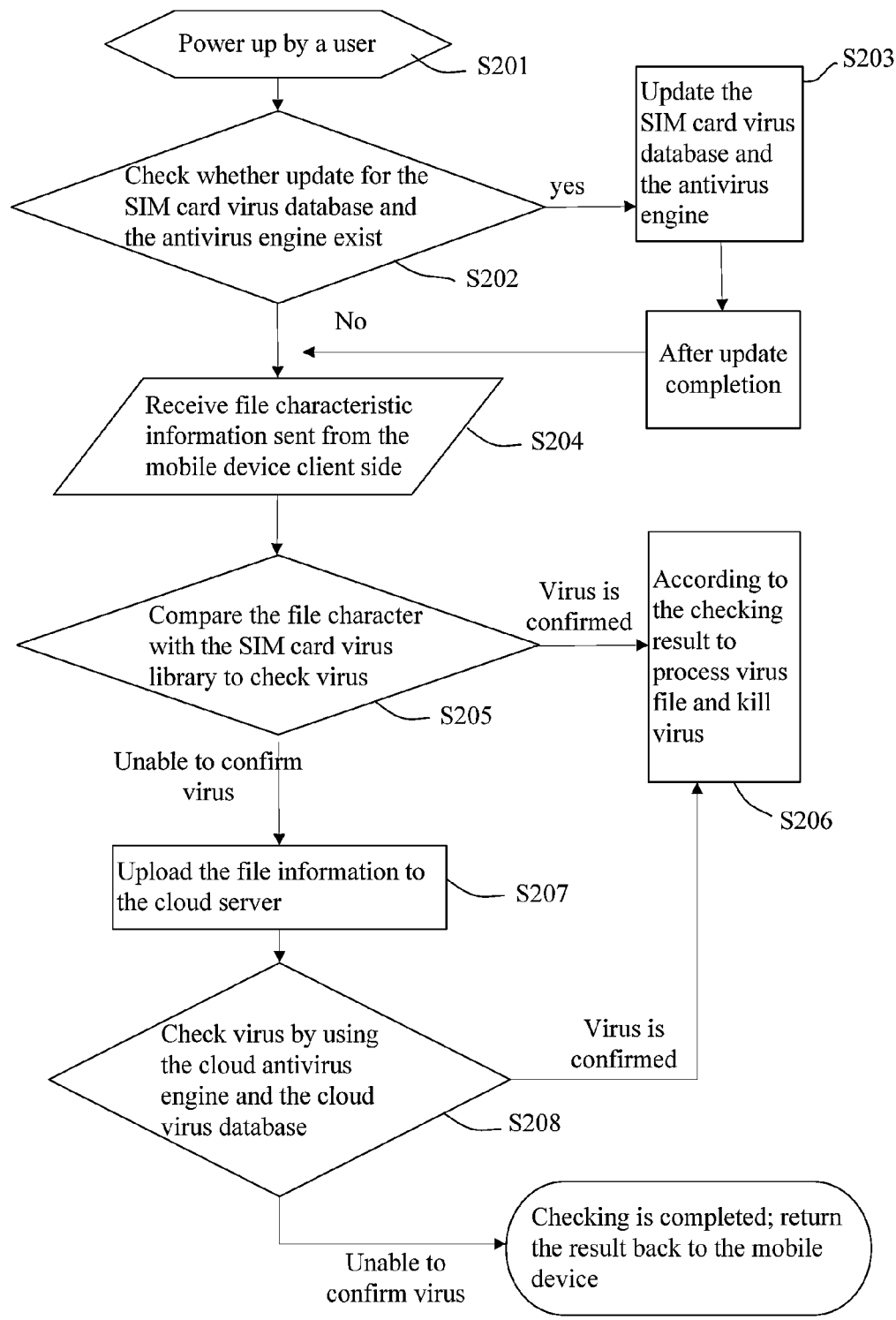
FIG. 2 is a flowchart illustrating running flow of the SIM card combined with cloud antivirus according to the present invention.

According one embodiment of the invention, referring to the flow of flowchart FIG. 2, firstly in step S201, a user powers up the mobile device; at that time, SIM card should be installed in a corresponding slot of the mobile device already. In step S202, the SIM card antivirus engine checks whether the virus database update and the antivirus engine update is existed. The step comprises accessing a server side of the telecom service provider via GPRS network communication or other types of wireless communication, such as WCDMA, TD-SCDMA or CDMA2000, etc., so as to make the service provider can update the current virus database and antivirus engine at any time and guarantees accuracy and time efficiency of antivirus operation. In the step, the present SIM card antivirus engine and the version information of the virus database can be transferred to the telecom service provider also via the upstream communication of the OTA technology and the telecom service provider sends update for the SIM card antivirus engine and the virus database to the SIM card of the mobile device by adapting downstream communication of OTA technology. Optionally, the update for the antivirus engine and the virus database can also be transferred in form of data broadcast to all the SIM cards of the mobile devices with subscription service by the telecom service provider. The data broadcast can be received by the user when the user powers up the device so as to update the antivirus engine of the SIM card and the virus database. In addition, controlled by the software of a mobile phone client side, the SIM card antivirus engine of and the virus database can also updates automatically timely.

If update has been detected in step S202, go to step S203 to download the latest updated antivirus engine and the virus database by connecting to the corresponding server of the service provider and then update the antivirus engine and the virus database on the SIM card. Go to step S204 after the completion of the updating.

According to the embodiment, the SIM card virus database includes a list of virus information which is generally provided by an antivirus software provider. The virus information at least includes three types of information, e.g. virus type, virus name and virus signature code. The virus types for the mobile device include, but not limited to, malicious payment, privacy stealing or projan, etc. Generally, virus name is a name defined an antivirus software company or other organizations for a virus, for example, geimimi.A. Virus signature code is computed by an antivirus software company for a special virus file. Specifically, a message digest is generated for binary code of every virus file. Such computing progress above can adapt secure hash algorithms such as SHA-1 or MD5 or other algorithms. Whatever the algorithm is, such rendering progress only needs to guarantee that every virus file corresponds a unique digest information for the convenience of identifying and extracting virus file.

If no update is detected in step S202, go to step S204 to start checking and killing step of the SIM card antivirus engine. Firstly, the SIM card antivirus engine sends a request to the client side on the mobile device of upper layer; the request represents that the antivirus engine is ready and hopes to obtain the information of the current file.

After the responding of the client side on the mobile device, the client side on the mobile device returns the information of the current file and the information of installed program; The SIM card antivirus engine receives the information of the current file sent by the client side on the mobile device and collects the information of installed program. In step S205 the SIM card antivirus engine checks virus according to the current virus database, file and information of installed program; and the SIM card antivirus engine sends the result of checking back to the client side on the mobile device in Step 206. Virus checking comprises that the SIM card antivirus engine compares the file information in the file signature data list with the virus file signature data stored in the SIM card virus database piece by piece. If the result of checking shows that the current file contains virus, the client side on the mobile device will perform operation of killing virus according to the corresponding checking result.

If the checking result can not determine whether the current file contains virus, the client side on the mobile device will upload the information of the current file to the cloud server in step S207; and the cloud server performs virus checking and returns the checking result back to the client side on the mobile device in step S208.

After a period of time, the client side on the mobile device sends a request to the SIM card engine and the SIM card engine repeats the process of killing virus. The period of time is determined by the specific capability of the CPU of the SIM card and the mobile device; or the user of the mobile device can determine the period of time by oneself in such way that the client side on the mobile device will performs detecting and checking operation automatically.

According one embodiment of the invention, the SIM card virus database is classified according the operating system of the client side on the mobile device, for example, the Symbian platform developed by Nokia, the Android platform developed by Google, or the IOS platform developed by Apple, etc. And researching SIM card virus database is limited to research the classification corresponding to the system platform. Before step S203, the SIM card antivirus engine receives information related to the operating system platform of the mobile device before researching the file signature data. Furthermore, in step S205, the research scope of the SIM card antivirus engine is limited to the classification of the virus character corresponding to the operating system platform.

Figure 3:
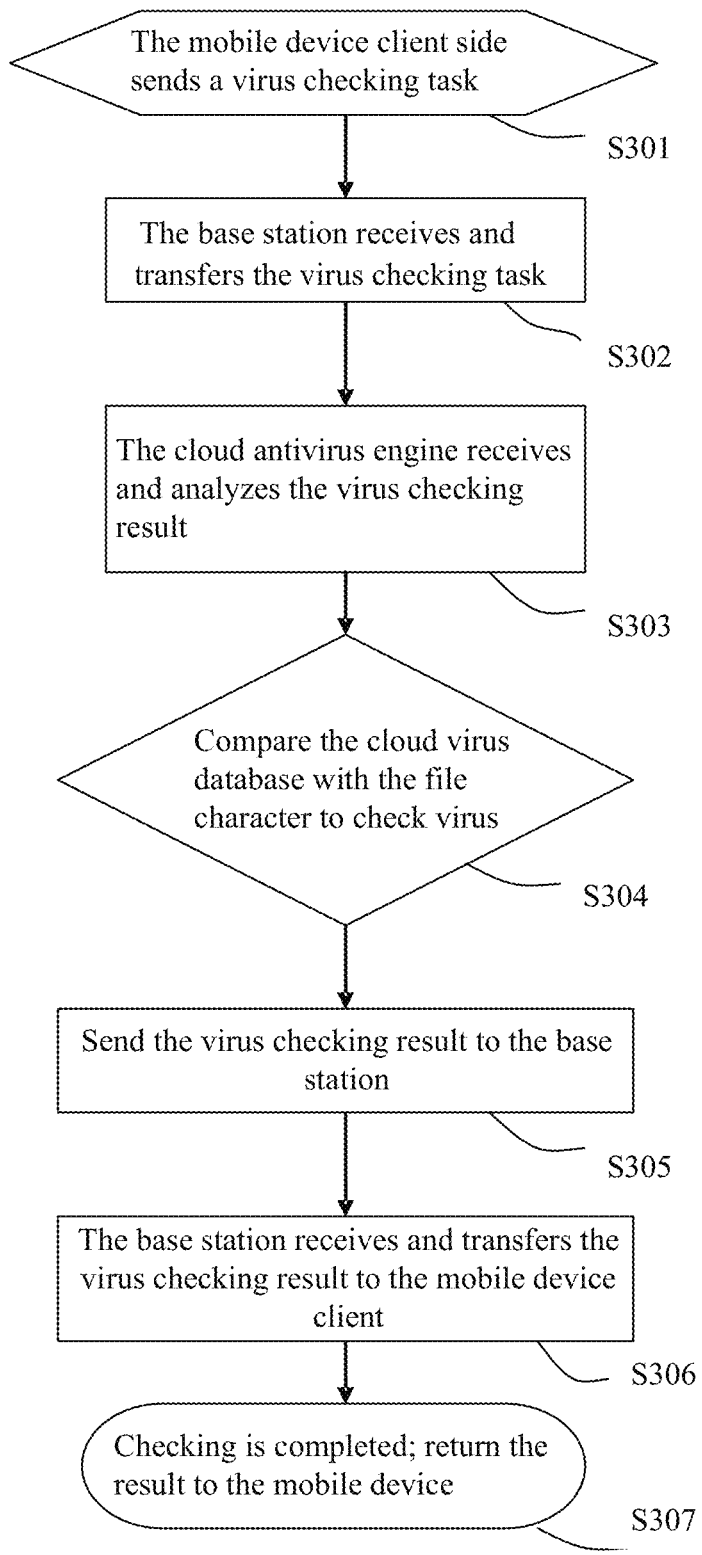
FIG. 3 is a flowchart illustrating running flow that a cloud antivirus engine responds to a client side on the mobile device according to the present invention.

According one embodiment of the invention, when the SIM card antivirus engine and the virus database can not determine whether the file of the mobile device contains virus, the cloud server is adapted for checking virus of which the process is shown in FIG. 3. In step S301, the client side on the mobile device sends a virus checking task to the base station. The virus checking task includes identification information of the mobile device, information of the client side on the mobile device, the signature and the command of virus checking. In step S302, the base station receives the virus checking task and sends the virus checking task to a corresponding cloud server. In step S303, after the cloud server receives the virus checking task, the cloud antivirus engine on the cloud server processes the virus checking task and invokes the cloud virus database to check the signature of the file of the client side on the mobile device. In step S304, the cloud antivirus engine compares the file signature of the client side on the mobile device with the virus file signature of the cloud database. The cloud antivirus engine gets the result of checking virus and records the result in the virus database. In step S305, the cloud antivirus engine sends the checking result and identification information of the corresponding mobile device to the base station. In step S306, the base station transfers the checking result to the corresponding mobile device; and in step S307, the client side on the mobile device processes the checking result subsequently. According to the embodiment, processing the checking result includes but not limited to means of removing virus file, killing the process of the virus file, renaming or isolating the virus file, etc.

Figure 4:
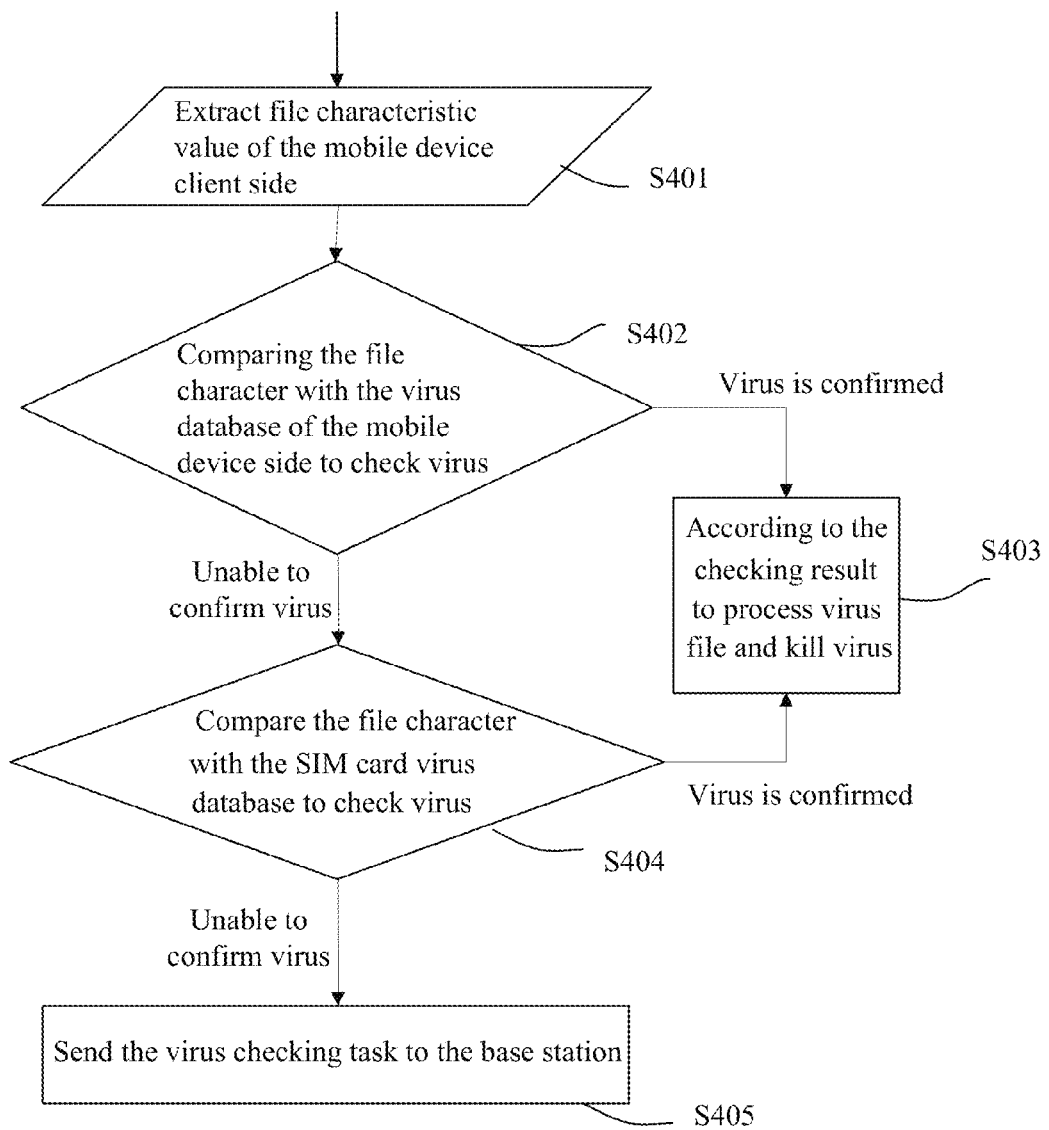
FIG. 4 is a flowchart illustrating running flow of a virus database of the client side on the mobile device adapted by the present invention.
Figure 5:
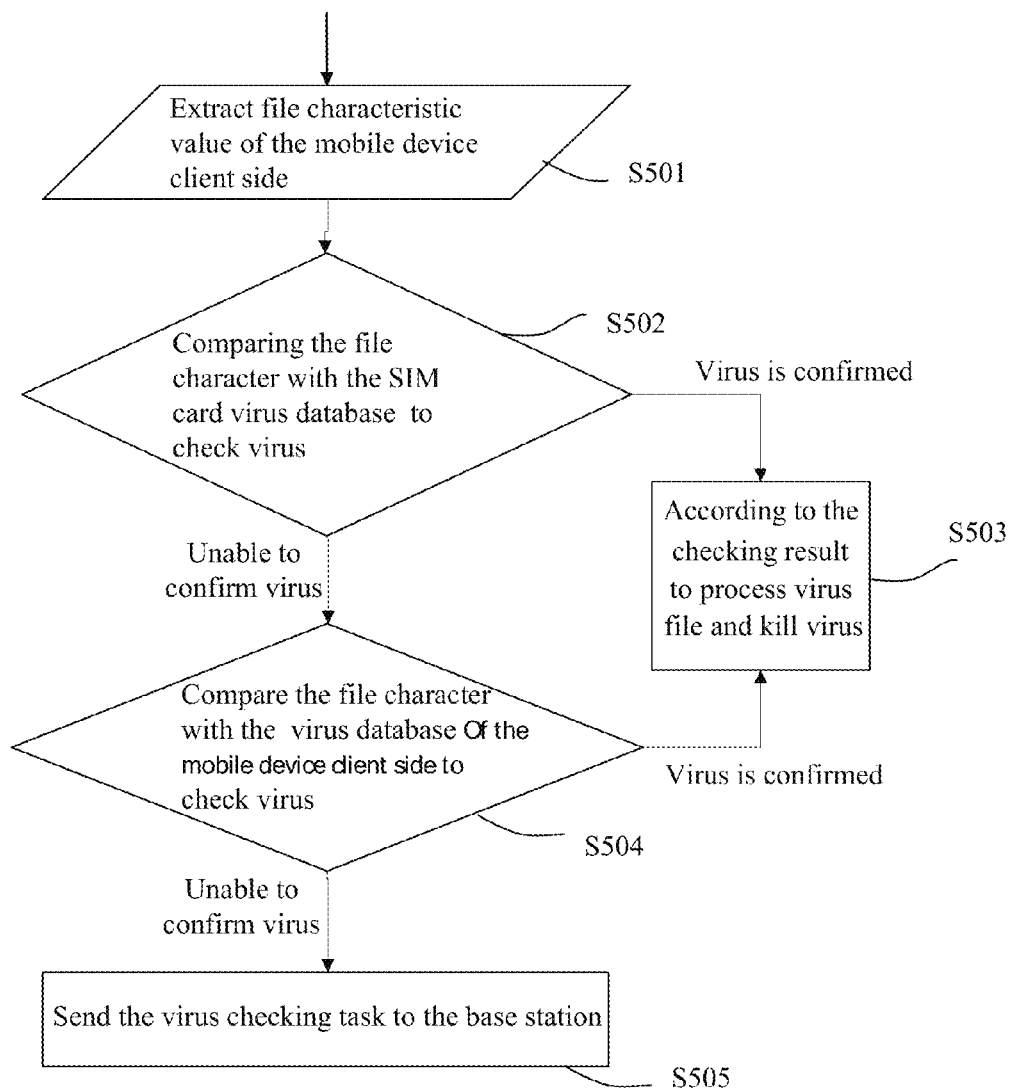
FIG. 5 is a flowchart illustrating combination of the virus database of the client side on the mobile device and a SIM card virus database adapted by the present invention.

According to one embodiment of the invention, antivirus software installed in the mobile device begins to perform antivirus operation as responding to the operation of the mobile device user. Referring to FIG. 4, in step S401, the file signature in the mobile device is extracted by the antivirus software of the mobile device. The signature comprises computing message digest of the file. Such computing process can adapt security hash algorithm such as SHA-1 or MD5. Such rendering progress guarantees that every mobile device file is corresponding to an unique digest information; In step S402, the antivirus software in the mobile device compares the extracted file signature and the virus file signature in the virus database stored in the mobile device piece by piece. If the result of comparison is that the file contains virus, go to step S403, the antivirus software in the mobile device processes the virus file subsequently, such as removing, isolating protection, etc. If the result of the comparison can not determine whether the file contains virus, go to step S404; the file signature is transmitted to the SIM card antivirus engine and the SIM card antivirus engine invokes and compares the virus signature in the SIM card virus database with the signature piece by piece. If the result of comparison determines that the file contains virus, go to step S403; the antivirus software of the mobile device processes the virus file subsequently, such as removing, isolating protection, etc. If the result of comparison can not determine whether the file contains virus yet, go to step S405, the virus checking task is sent to the base station and cloud antivirus performs further virus checking. The virus checking task includes the identification information of the mobile device, the information and signature of the mobile device file and the command of the virus checking.

According one embodiment of the invention, as shown by step S501, the client side on the mobile device obtains the information and signature of the mobile device file. According to the embodiment, the client side on the mobile device scans the mobile device file and extracts the signature. The step of extracting the signature includes computing digest information of every scanned mobile device file. Such computing process can adapt secure hash algorithm such as SHA-1 or MD5. Such computing process guarantees that every mobile device file corresponds an unique digest information. Then in step S502, the information and a single file or the file signature are returned back to the SIM card antivirus engine; the SIM card antivirus engine compares the extracted file characteristic value and the characteristic value of the virus file stored in the SIM card virus database one by one so as to perform checking and sends the result of checking back to the client side on the mobile device. If the result of checking can determine that the file contains virus, go to step S503; the antivirus software in the mobile device further processes the file, such as removing, isolating protection, etc. If the result of checking can not determine whether the file contains virus, go to step S504; the virus database of the antivirus software of the mobile device is used to check the signature of the file. If the checking result can determine that the file contains virus, go to step S503; the antivirus software in the mobile device further processes the file, such as removing, isolating protection, etc. If the checking result can not determine whether the file contains virus, go to step S505, the virus checking task is sent to the base station and the cloud antivirus performs further virus checking. The virus checking task includes the identification information of the mobile device, the information and signature of the mobile device file and the command of the virus checking.

Figure 6:
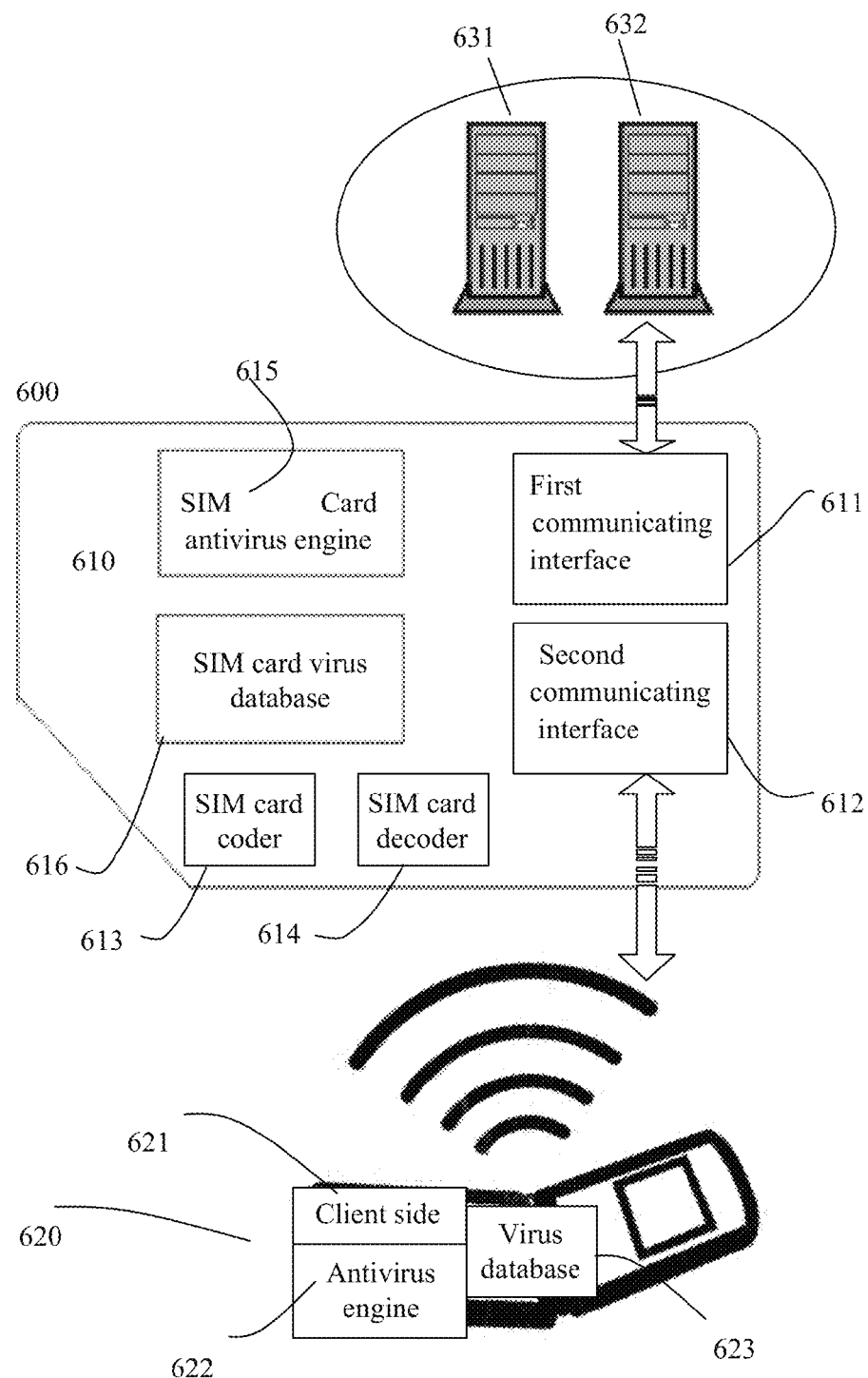
FIG. 6 is a systematic diagram illustrating the SIM card combined with could antivirus adapted by the present invention.

According to one embodiment of the invention, referring to FIG. 6, a system for implementing virus checking by using a SIM card combined with cloud antivirus comprises a SIM card 610, a client side on the mobile device 621, a cloud antivirus engine 631 and a cloud virus database 632. The SIM card 610 comprises a SIM card first communicating interface 611 and a SIM card second communicating interface 612. The mobile device 620 comprises a client side on the mobile device 621. The cloud server 630 comprises a could antivirus engine 631 and a cloud virus database 632.

According to the embodiment, the SIM card is arranged with at least a central processing unit (CPU), a program memory ROM, a working memory RAM, a data storage unit (EPROM or E2PROM) and a communication unit. The SIM card first communicating interface 611 connected to the mobile device 620 is adapted for receiving a virus checking task and file signature data of a current mobile device sent by the client side on the mobile device 621. The SIM card second communicating interface is adapted for communicating with a telecom base station via the mobile device and uploads the virus checking task and the file signature data via OTA technology. When the client side on the mobile device sends the virus checking task and file signature data to the SIM card via the SIM card first communicating interface, a SIM card encoder 613 encodes the received information into a format which is adaptable for upstream communication of OTA. A SIM card decoder 614 decodes a virus checking result, which is transmitted by the cloud server via the downstream communication of OTA, into a data format which is adaptable for being read and processed by the client side on the mobile device 621.

Specifically, the virus checking task and the file signature data list are transferred to the SIM card in form of datagram via the SIM card first communicating interface 611. Such transferring follows ISO7816-4 standard specification protocol. The SIM card working memory stores the received information temporarily and the SIM card encoder 613 encodes the datagram. The SIM card encoder 613 segments the data of the message and generates corresponding MAC codes and random bits. According to the limitation of the format and the byte length of the short message regulated by the telecom service provider, one or more short messages are generated from data segments and the synchronize sequence number of the short message is encoded. Then the mobile device 620 transfers the generated short message to the base station of the telecom service provider and then to the cloud server 630.

The cloud virus database 632 is stored with the cloud virus database comprising a list of virus information which is generally is provided by the antivirus software vendor. The virus information includes at least 3 type of information such as virus type, virus name and signature code of the virus. The virus types of the mobile device include but not limited to malicious payment, privacy stealing or projan, etc. The cloud virus engine 631 receives virus checking task and compares the file information in the file signature data list with the virus file signature data stored in the cloud virus database piece by piece.

After implementing virus checking, the checking result is sent to the mobile device 620 by the telecommunication base station in form of data broadcast of OTA technology. Such communication follows the transmission means of SMS_PP described by GSM03.48. The SIM card in the mobile device downloads a message containing virus checking result to the working storage unit RAM of the SIM card via the SIM card second communicating interface 612 by adapting downstream communication of OTA technology. In case of including a plurality of messages, the SIM card decoder will sort the messages. The SIM card decoder decodes the data in the short message and generates the datagram of virus checking result. The datagram is transferred to the client side on the mobile device 621 via the SIM card first communicating interface 611.

According to one embodiment of the invention, the SIM card 610 comprises a SIM card antivirus engine 615 and a SIM card virus database 616. The SIM card virus database 616 comprises a list of virus information which is generally provided by the antivirus software vendor. The telecommunication service provider can update the SIM card virus database 616 and the SIM card antivirus engine via the form of data broadcast of the OTA. When the SIM card receives the update of the SIM card virus database 616 or the antivirus engine 615; the update is stored temporarily by the SIM card working memory RAM and the SIM card decoder 614 decodes the information related to the update and adds the decoded update into the present SIM card virus database 616 and the present antivirus engine 615 or replaces the present SIM card virus database 616 and the present antivirus engine 615 with the decoded update. The SIM card antivirus engine 615 can receive the virus checking task and the file signature data from the client side on the mobile device 621 and uses the SIM card virus database 616 to check the virus.

According to one embodiment of the invention, the client side on the mobile device 621 comprises a client side antivirus engine 622 and a client side virus database 623. The client side on the mobile device 621 sends the virus checking task and the file signature data to the client side antivirus engine 622, the client side antivirus engine 622 can check the virus by using the client side virus database 623.

In order to illustrate the purpose of the invention, it is impossible to illustrate every combination of the device or method. However, those skilled in the art should appreciate that a plurality of further combinations and modifications are available. Therefore, the invention is intended to cover all of such amendments, modification and changes, such as the update means of the engine and virus database of the SIM card, the content of the communication between the SIM card and the client side on the mobile device and the flow of the behavior of the client side on the mobile device, and the SIM card combined with cloud antivirus twin engines mode. In addition, though a certain feature may be disclosed according to one of the embodiments, the feature can be combined with the features of other embodiments.

We claim:

1. A method for performing cloud antivirus operation using a SIM card, the method comprising:
    receiving, at a SIM card first communicating interface, a virus checking task and file signature data of a mobile device from the mobile device;
    transferring the virus checking task and the file signature data from a SIM card second communicating interface to a cloud server using OTA (Over-the-Air) communications;
    receiving, at the SIM card second communicating interface, a virus checking result sent via OTA communications from a telecommunications base station in communication with the cloud server; and
    transferring the virus checking result to the mobile device via the SIM card first communicating interface,
    wherein the virus checking result is determined by a cloud antivirus engine and a cloud virus database associated with the cloud server based on the virus checking task and the file signature data.

2. The method of claim 1, wherein the file signature data of the mobile device comprises a file name.

3. The method of claim 1, wherein the OTA communications are sent using a short message.

4. The method of claim 1, further comprising:
    checking the file signature data of the mobile device at a SIM card virus database.

5. The method of claim 1, further comprising:
    comparing the file signature data of the mobile device with file signature data stored in the SIM card virus database using a SIM card antivirus engine.

6. The method of claim 1, further comprising:
    transforming, by a SIM card encoder, the file signature data into a format which is adaptable for OTA communications.

7. The method of claim 1, further comprising:
    transforming, by the client side on the mobile device, the file signature data into a format which is adaptable for OTA communications.

8. The method of claim 1, further comprising:
    transforming, by a SIM card decoder, the virus checking result into a format which is adaptable for being read and processed by the mobile device.

9. The method of claim 1, wherein the virus checking task and the file signature data are transferred from the mobile device to the SIM card in the form of a datagram.

10. A system for performing cloud antivirus operation using a SIM card, the system comprising:
    a SIM card in communication with a mobile device, a cloud server, and a telecommunications base station, the SIM card comprising:
    a SIM card first communicating interface operable to receive a virus checking task and file signature data of the mobile device from the mobile device;
    and to transfer a virus checking result to the mobile device; and
    a SIM card second communicating interface operable to transfer the virus checking task and the file signature data to the cloud server using OTA (Over-the-Air) communications; and to receive the virus checking result sent via OTA communications from the telecommunications base station in communication with the cloud server; and to transfer the virus checking result to the SIM card first communicating interface,
    wherein the virus checking result is determined by a cloud antivirus engine and a cloud virus database associated with the cloud server based on the virus checking task and the file signature data.

11. The system of claim 10, wherein the file signature data of the mobile device comprises attributes corresponding to an operating system platform.

12. The system of claim 10, wherein the OTA communications are sent using a short message.

13. The system of claim 10, further comprising a SIM card virus database operable to check the file signature data of the mobile device.

14. The system of claim 13, further comprising a SIM card antivirus engine operable to compare the file signature data of the mobile device with file signature data stored in the SIM card virus database.

15. The system of claim 10, further comprising a SIM card encoder operable to transform the file signature data into a format which is adaptable for OTA communications.

16. The system of claim 10, further comprising a SIM card decoder operable to transform the virus checking result into a format which is adaptable for being read and processed by the mobile device.

17. The system of claim 10, wherein the virus checking task and the file signature data are transferred from the mobile device to the SIM card in the form of a datagram.

18. A system for performing cloud antivirus operation using a SIM card, the system comprising:
    a SIM card in communication with a mobile device, a cloud server, and a telecommunications base station, the SIM card comprising:
    a SIM card first communicating interface operable to receive a virus checking task and file signature data of the mobile device from the mobile device;
    and to transfer a virus checking result to the mobile device;
    a SIM card virus database operable to check the file signature data of the mobile device;
    a SIM card antivirus engine operable to compare the file signature data of the mobile device with file signature data stored in the SIM card virus database; and
    a SIM card second communicating interface operable to transfer the virus checking task and the file signature data to the cloud server using OTA (Over-the-Air) communications; and to receive the virus checking result sent via OTA communications from the telecommunications base station in communication with the cloud server; and
    to transfer the virus checking result to the SIM card first communicating interface,
    wherein the virus checking result is determined by a cloud antivirus engine and a cloud virus database associated with the cloud server based on the virus checking task and the file signature data.

* * * * *